United States Patent
Enokido et al.

(10) Patent No.: US 10,157,701 B2
(45) Date of Patent: Dec. 18, 2018

(54) R-T-B BASED PERMANENT MAGNET

(71) Applicant: TDK CORPORATION, Tokyo (JP)

(72) Inventors: Yasushi Enokido, Tokyo (JP); Kenichi Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 3 days.

(21) Appl. No.: 14/666,831

(22) Filed: Mar. 24, 2015

(65) Prior Publication Data

US 2015/0279526 A1 Oct. 1, 2015

(30) Foreign Application Priority Data

Mar. 28, 2014 (JP) ................. 2014-068511

(51) Int. Cl.
*H01F 1/01* (2006.01)
*H02K 1/02* (2006.01)
*H01F 1/057* (2006.01)

(52) U.S. Cl.
CPC ............. *H01F 1/01* (2013.01); *H01F 1/0577* (2013.01); *H02K 1/02* (2013.01)

(58) Field of Classification Search
None
See application file for complete search history.

(56) References Cited

U.S. PATENT DOCUMENTS

2002/0062884 A1  5/2002  Kaneko et al.

FOREIGN PATENT DOCUMENTS

| CN | 103474225 A | * 12/2013 |
|---|---|---|
| JP | S59-046008 A | 3/1984 |
| JP | S61-81606 A | 4/1986 |
| JP | 2002-190404 A | 7/2002 |
| JP | 2009-302262 A | 12/2009 |
| JP | 2010-034522 A | 2/2010 |
| JP | 2010-045068 A | 2/2010 |
| JP | 5464289 B1 | 4/2014 |

OTHER PUBLICATIONS

Tang et al. (Journal of Applied Physics, Apr. 2010, vol. 107, 09A728).*
Liu et al. (IEEE Transactions on Magnetics, Nov. 2012, vol. 48, pp. 2797-2799).*
Li et al. (Journal of Applied Physics, Apr. 1991, vol. 69, pp. 5515-5517).*
Machine translation of CN 103474225 A. Dec. 2013.*
Aug. 13, 2014 Office Action issued in Japanese Application No. 2014-068511.

* cited by examiner

*Primary Examiner* — Xiaowei Su
(74) *Attorney, Agent, or Firm* — Oliff PLC

(57) ABSTRACT

The present invention provides a R-T-B based permanent magnet, comprising a demagnetization curve having a slope $\Delta J/\Delta(H/HcJ)$ of less than 400 kG at a region where the value of magnetic field is Hk or less, wherein it is preferable that R in the composition of R-T-B is represented by $(R1_{1-x}R2_x)$, and T represents one or more transition metal elements containing Fe or a combination of Fe and Co as necessary, where: R1 represents the rare earth element(s) composed of one or more elements selected from the group consisting of Pr, Nd, Sm, Eu, Gd, Tb, Dy, Ho, Er, Tm, Yb and Lu, and R2 contains at least one element selected from the group consisting of Y, Ce and La, and $0.2 \leq x \leq 0.7$.

12 Claims, 1 Drawing Sheet

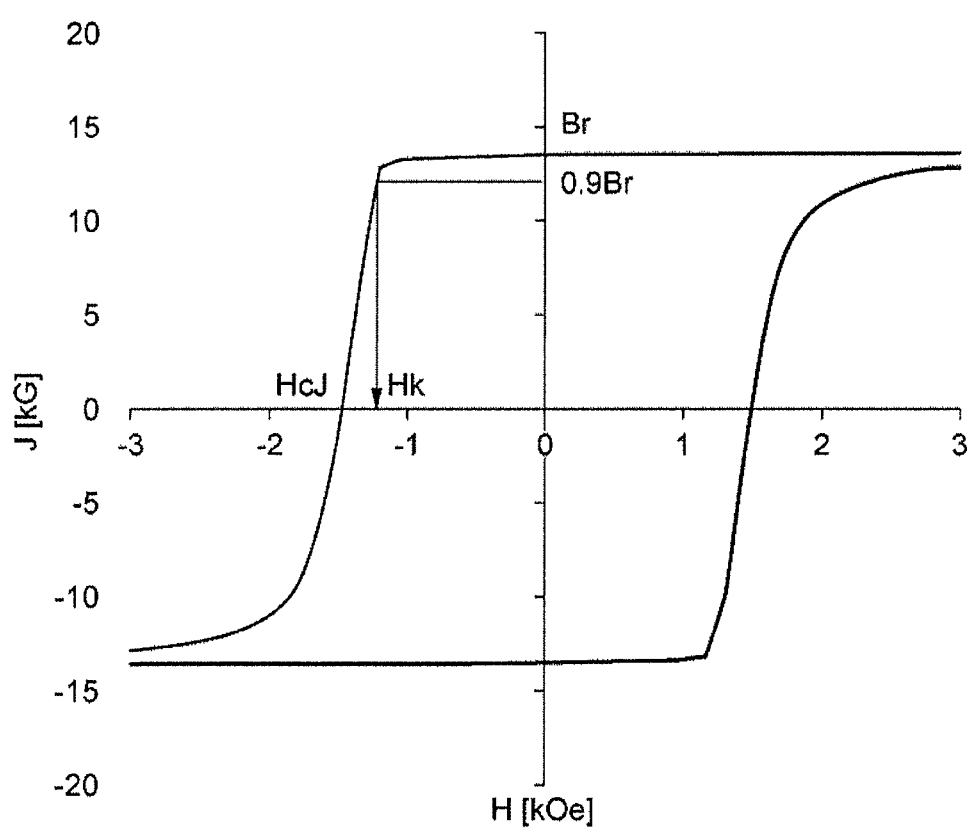

R-T-B BASED PERMANENT MAGNET

The present invention relates to a R-T-B based permanent magnet.

BACKGROUND

The R-T-B based permanent magnet (R represents a rare earth element, T represents Fe or Fe with part of it replaced with Co, and B represents boron) having the tetragonal compound $R_2T_{14}B$ as the main phase is known to have excellent magnetic properties and has been a representative permanent magnet with high performance since it was invented in 1982 (Patent document 1: JP-A-59-46008).

The R-T-B based magnet in which the rare earth element R is formed of Nd, Pr, Dy, Ho and/or Tb is preferable as a permanent magnet material with a big magnetic anisotropy field Ha. Among them, the Nd—Fe—B based magnet having Nd as the rare earth element R is widely used because it has a good balance among saturation magnetization Is, curie temperature Tc and magnetic anisotropy field Ha, and is better in resources and corrosion resistance than R-T-B based magnets having other rare earth elements.

As a power unit used in people's livelihood, industries and conveyer equipments, the permanent magnet synchronous motor has always been utilized. However, the permanent magnetic synchronous motor in which the magnetic field generated by the permanent magnet is constant is hard to be driven as the induced voltage increases in proportion to the rotational speed. Thus, when the permanent magnetic synchronous motor is operated in an intermediate/high speed region or under a low load, a field weakening control via which the magnetic flux generated by the armature current is used to counteract the magnetic flux of the permanent magnet is needed to suppress the induced voltage below the supply voltage. As a result, a problem is there that the efficiency of the motor deteriorates.

In order to solve the technical problem mentioned above, a variable magnetic flux motor is developed by using a magnet in which the magnetic force changes reversibly via an external magnetic field (a variable magnetic force magnet). When the variable magnetic flux motor is operated in the intermediate/high speed region or under a low load, the decrease of efficiency in the motor due to the field weakening effect in the prior art can be inhibited by reducing the magnetic force from the variable magnetic force magnet.

PATENT DOCUMENTS

Patent Document 1: JP-A-59-46008
Patent Document 2: JP-A-2010-34522
Patent Document 3: JP-A-2009-302262

In the variable magnetic flux motor, a constant magnet with a fixed magnetic force and a variable magnet with a variable magnetic force are used in combination. In order to ensure the high output and the high efficiency of the variable magnetic flux motor, the variable magnet is required to provide a magnetic flux equal to that of the constant magnet. However, the magnetization state of the variable magnet needs to be controlled by an applied small external magnetic field when the variable magnet is disposed inside a motor. In other words, the variable magnet needs magnetic properties such as a high residual magnetic flux density and a low coercivity.

In Patent Document 2, a variable magnetic flux motor which uses a Sm—Co based permanent magnet as the variable magnet has been disclosed, and the efficiency of the motor can be improved by using a Nd—Fe—B based permanent magnet as the constant magnet. However, the Sm—Co based permanent magnet used as the variable magnet has a residual magnetic flux density Br of about 10 kG which is lower than the residual magnetic flux density of about 13 kG in the Nd—Fe—B based permanent magnet used as the constant magnet. This becomes the reason why the output and the efficiency of the motor deteriorate.

Patent Document 3 has disclosed a variable magnetic flux motor which uses a R-T-B based permanent magnet as the variable magnet, wherein the R-T-B based permanent magnet necessarily contains Ce as a rare earth element R. As the R-T-B based permanent magnet having an equivalent structure with the Nd—Fe—B based permanent magnet which is the constant magnet is used as the variable magnet, a residual magnetic flux density Br equal to that of the constant magnet is expected in the variable magnet. Nevertheless, in Patent Document 3, if Ce as the rare earth element R is contained as a necessary component so as to control the coercivity at a low level preferred for the variable magnet, the residual magnetic flux density Br is around 8 kG to 12.5 kG. In this way, the residual magnetic flux density Br of the Nd—Fe—B based permanent magnet which is the constant magnet will not reach about 13 kG.

In addition, the R-T-B based magnet is hard to be controlled when it is used as the variable magnet. When the magnetic force is to be controlled by applying an external magnetic field, it will not be easy to control the magnetic force if the magnetic force sharply changes with respect to the magnetic field. Further, if the magnetic force of the variable magnet cannot be controlled at will, the variable magnetic flux motor will deteriorate in efficiency.

SUMMARY

In view of the problems mentioned above, the present invention is completed. The present invention aims to provide a variable magnet having a high residual magnetic flux density, a low coercivity and an excellent controllable magnetic force which can be suitably used in a variable magnetic flux motor with its efficiency being kept at a high level in a wide rotational speed region.

The R-T-B based permanent magnet of the present invention is characterized in that a demagnetization curve having a slope $\Delta J/\Delta(H/HcJ)$ of less than 400 kG at a region where the value of magnetic field is Hk or less, wherein it is preferable that R in the composition of R-T-B is represented by $(R1_{1-x}R2_x)$, and T represents one or more transition metal elements containing Fe or a combination of Fe and Co as necessary, where: R1 represents the rare earth element(s) composed of one or more elements selected from the group consisting of Pr, Nd, Sm, Eu, Gd, Tb, Dy, Ho, Er, Tm, Yb and Lu, and R2 contains at least one element selected from the group consisting of Y, Ce and La, and $0.2 \leq x \leq 0.7$.

The present inventors have found out that in the demagnetization curve of the R-T-B based permanent magnet, the smaller the gradient of $\Delta J/\Delta(H/HcJ)$ at the coercivity side where the value is lower than Hk, the easier the magnetic flux can be controlled and the more suitably the variable magnet can be used in the variable magnetic flux motor. Especially, if a specified amount of the rare earth element R is set to be any of Y, Ce and La or the combination thereof, a permanent magnet can be obtained with the properties as it can be suitably used as a variable magnet for the variable magnetic flux motor, and have a high residual magnetic flux density and a low coercivity, and its magnetization state can be controlled by a small external magnetic field.

If the magnetic force of a magnetized magnet is to be removed, a magnetic field with a direction opposite to the magnetization direction needs to be applied. Here, the needed magnetic field varies depending on the coercivity inducement mechanism or the absolute value of the coercivity of the magnet, but a magnetic field is needed which is equal to or higher than the coercivity. The reversed magnetic field is usually provided via the current flowing through the winding coil near the magnet. The flowing current varies depending on the state or the temperature of the winding wire or the state of the system for controlling the current, so the value of the flowing current may not necessarily constant. The current value directly relates to the intensity of the reversed magnetic field. If the magnetic flux sensitively changes based on the intensity of the reversed magnetic field, it is hard to keep the magnetic flux of the variable magnet at a fixed value after the reversed magnetic field is applied. In this case, a variable magnet is needed whose magnetic flux responds slowly to the reversed magnetic field.

In other words, it is desired that the magnetization will be slowly reduced in the region where the magnetization sharply decreases in the demagnetization curve. If the magnetization slowly decreases, the range of the reversed magnetic field for the desired allowable level of magnetization is widened. If the absolute value of the needed magnetic field increases, the controllability will deteriorate even if the absolute value of the range of the reversed magnetic field is the same. Thus, $\Delta J/\Delta(H/HcJ)$ obtained by dividing H by coercivity HcJ, but not $\Delta J/\Delta H$, is expected to be small.

In the variable magnetic flux motor, the variable magnet can be magnetized to a value other than 0 by applying the reversed magnetic field. However, when the magnetization is varied to a value other than 0, if $\Delta J/\Delta(H/HcJ)$ is small, the controllability can not be considered to become better.

When the squareness ratio (Hk/HcJ) is small, demagnetization is likely to happen even if $\Delta J/\Delta(H/HcJ)$ is small. In this respect, when the squareness ratio is kept at or above a certain level, $\Delta J/\Delta(H/HcJ)$ is desired to be small. Here, Hk refers to the value of the magnetic field when the magnetic flux density becomes 90% of the residual magnetic flux density (Br). Here, the slope from Hk to HcJ is referred to as $\Delta J/\Delta(H/HcJ)$ in the present invention.

The present inventors have made great effort to prepare a magnet with a small $\Delta J/\Delta(H/HcJ)$. As a result, they have found out that a magnet with a small $\Delta J/\Delta(H/HcJ)$ can be provided by adjusting the composition of the R-T-B based magnet. In order to enable $\Delta J/\Delta(H/HcJ)$ to be small, a wide distribution of coercivity is needed for respective particles inside the magnet. The coercivity inducement mechanism of the R-T-B based magnet is the nucleation type, i.e., the state of the magnetic separation among particles provided by the grain boundary phases will affect the coercivity of each particle. If the magnetic separation is not uniform, the coercivity will be distributed in a wider range, further decreasing $\Delta J/\Delta(H/HcJ)$.

As a method for rendering the magnetic separation uneven, it will be effective to make the grain boundary phases uneven. The grain boundary phase of the Nd—Fe—B based magnet is mainly composed of a phase with Nd as the main component which is called as Nd-rich phase. The Nd-rich phase has a good magnetic separation and shows a high coercivity. In contrast, as the Y-rich phase, the Ce-rich phase or the La-rich phase has different magnetic separation properties compared to the Nd-rich phase, there has a coercivity distribution by compounding these phases with the Nd-rich phase to exist.

However, if only Y, Ce or La is added, as the grain boundary phases, uniform solid solution phases are formed so that it is hard to obtain an uneven coercivity distribution. Here, the Y-rich phase, the Ce-rich phase or the La-rich phase will be formed in the grain boundary portions by performing a long-lasting thermal treatment of 6 hours or longer. These phases form a multiple phase with the Nd-rich phase so that the coercivity distribution is obtained successfully.

According to the present invention, if a demagnetization curve having a slope $\Delta J/\Delta(H/HcJ)$ of less than 400 kG at a region where the value of magnetic field is Hk or less, a permanent magnet can be obtained with the properties as it can be suitably used as a variable magnet for the variable magnetic flux motor, and have a high residual magnetic flux density and a low coercivity, and its magnetization state can be controlled by a small external magnetic field, and thus possesses a good controllability.

BRIEF DESCRIPTION OF THE DRAWINGS

FIG. 1 is a magnetization-magnetic field curve used to calculate the $\Delta J/\Delta(H/HcJ)$ in the present invention.

DETAILED DESCRIPTION OF EMBODIMENTS

Hereinafter, the preferable embodiments of the present invention will be described in detail. The embodiments are exemplary and provide no limitation to the present invention. Further, not all the features described in the embodiments or the combinations thereof are necessarily limited to the substantial content of the invention.

The R-T-B based permanent magnet of the present invention is characterized in that a demagnetization curve having a slope $\Delta J\Delta(H/HcJ)$ of less than 400 kG at a region where the value of magnetic field is Hk or less, wherein it is preferable that R in the composition of R-T-B is represented by $(R1_{1-x}R2_x)$, and T represents one or more transition metal elements containing Fe or a combination of Fe and Co as necessary, where: R1 represents the rare earth element(s) composed of one or more elements selected from the group consisting of Pr, Nd, Sm, Eu, Gd, Tb, Dy, Ho, Er, Tm, Yb and Lu, and R2 contains at least one element selected from the group consisting of Y, Ce and La, and $0.2 \leq x \leq 0.7$.

In the present embodiment, part of B can be replaced with C. The amount of C to replace B is preferably 10 atomic % or less with respect to B.

In the present embodiment, as the balance of the composition, T represents one or more transition metal elements containing Fe or a combination of Fe and Co as necessary. The amount of Co is preferably 0 atomic % or more and 10 atomic % or less with respect to the amount of T. With the increase of the amount of Co, the curie temperature can be increased and the decrease of the coercivity with respect to the increase of temperature can be inhibited to a low level. Further, the corrosion resistance of the rare earth based permanent magnet can be improved by increasing the amount of Co.

Hereinafter, the preferable example of the preparation method in the present invention will be described.

In the preparation of the R-T-B based permanent magnet in the present embodiment, the starting alloy(s) will be prepared first with which a R-T-B based magnet having the desired composition can be obtained. The starting alloy(s) can be prepared by the strip casting method or other well known melting methods under vacuum or at inert atmosphere, preferably at Ar atmosphere. In the strip casting method, the molten metal obtained by melting the starting metal at a non-oxidative atmosphere such as Ar atmosphere is sprayed to the surface of a rotating roll. The molten metal quenched at the roll will be solidified into a thin plate or a sheet (a flake). The quenched and solidified alloy is provided with a homogeneous structure having a crystal particle size of 1 to 50 µm. The method for preparing the starting alloy is not limited to the strip casting method, and the starting alloy can also be obtained by melting methods such as the high frequency induction melting method. Further, in order to prevent the segregation from happening after the melting process, for example, the molten metal can be poured on a water cooled copper plate so as to be solidified. Also, the alloy obtained by the reduction diffusion method can be used as the starting alloy.

In the present invention, in the preparation of the R-T-B based permanent magnet, the starting alloy is basically prepared by applying a single alloy method in which one kind of alloy is used to prepare the magnet. The mixing method can also be applied in which the main phase alloy (the alloy with a low amount of R) which has the $R_2T_{14}B$ crystals (which are the main phase grains) as the main body is used as well as the alloy (the alloy with a high amount of R) which effectively helps to form the grain boundaries and contains more R than the alloy with a low amount of R.

The starting alloy is subjected to a pulverization process. When the mixing method is utilized, the alloy with a low amount of R and the alloy with a high amount of R are pulverized separately or pulverized together. A coarse pulverization process and a fine pulverization process are there in the pulverization process. First of all, the starting alloy is coarsely pulverized to have a particle size of about several hundreds of microns. The coarse pulverization process is preferably performed at inert atmosphere by using a stamp mill, a jaw crusher, a brown mill or the like. The pulverization process will be effectively performed if hydrogen is adsorbed to the starting alloy and then discharged before the coarse pulverization process. The hydrogen discharging treatment is performed to reduce the hydrogen constituting the impurity in the rare earth based sintered magnet. The temperature for heating and keeping in the hydrogen adsorption is at 200° C. or higher, preferably 350° C. or higher for. The time for keeping changes depending on its relationship with the temperature for keeping and the thickness of the starting alloy or the like, but is at least 30 minutes or longer, preferably 1 hour or longer. The hydrogen discharging treatment is done under vacuum or under Ar stream. In addition, the hydrogen adsorbing treatment and the hydrogen discharging treatment are not necessary. Also, the pulverization with hydrogen can be utilized as the coarse pulverization process so that the mechanically coarse pulverization can be omitted.

After the coarse pulverization process, the resultant particles are transferred to the fine pulverization process. In the fine pulverization process, the jet mill is mainly used to turn the coarsely pulverized powder with a particle size of about several hundreds of microns into a powder with an average particle size of 2.5 to 6 µm preferably 3 to 5 µm. The jet mill ejects inert gas with a high pressure via a narrow nozzle so as to generate a gas flow with a high speed with which the coarsely pulverized powder is accelerated. Then, the coarsely pulverized powder hits each other or hit the target or the wall of the container to perform the pulverization.

The wet pulverization can also be used in the fine pulverization process. In the wet pulverization, a ball mill or a wet attritor is used to turn the coarsely pulverized powder with a particle size of about several hundreds of microns into a powder with an average particle size of 1.5 to 5 µm preferably 2 to 4.5 µm. The magnet powder will be pulverized without any contact with oxygen by choosing a proper dispersed medium so that a fine powder with a low concentration of oxygen will be obtained.

During the fine pulverization, about 0.01 to 0.3 wt % of fatty acid or a derivative of fatty acid or hydrocarbon may be added to improve the lubrication and orientation in the molding process such as zinc stearate, calcium stearate, aluminum stearate, octadecanamide, oleamide, ethylene bis (isostearamide) (all of which are stearic acid based or oleic acid based compounds); paraffin and naphthalene (which two are hydrocarbons) or the like.

The finely pulverized powder is subjected to a molding process in a magnetic field. In the molding process under a magnetic field, the molding pressure is set to be 0.3 to 3 ton/cm$^2$ (30 to 300 MPa). The molding pressure can be constant or eventually increased or eventually decreased from the start to the end of the molding, and also can be randomly changed. The lower the molding pressure is, the better the orientation is. If the molding pressure is much too low, the strength of the molded article will be insufficient, thereby leading to problems in the handling treatment. Thus, the molding pressure is considered to be set within the range mentioned above. The molded article obtained in the molding process under a magnetic field will usually have a final relative density of 40 to 60%.

The applied magnetic field has an intensity of around 400 to 1600 kA/m (5 to 20 kOe). The applied magnetic filed is not limited to the static magnetic field. A pulsed magnetic field can also be used. Further, the static magnetic field and the pulsed magnetic field can be used in combination.

The molded article is subjected to a sintering process. The sintering process is performed under vacuum or at inert atmosphere. The temperature varies depending on the composition. Nevertheless, the process is preferably performed at 1000 to 1100° C.

After sintered, the obtained sintered article is subjected to an aging treatment. This process is important for controlling the coercivity. When the aging treatment is divided into two stages, it will be effective to perform the process at around 800° C. and then around 500° C. respectively for a specified time. If a thermal treatment at about 800° C. is done after the sintering process, the coercivity will increase. Further, a thermal treatment at around 500° C. will evidently increase the coercivity. Thus, if only one stage is there in the aging treatment, the aging treatment can be performed at about 500° C.

EXAMPLES

Hereinafter, the present invention will be further described in detail based on the examples and comparative examples. However, the present invention is not limited to the examples described below.

Specified amounts of the rare earth metal(s), the electrolytic iron and ferro-boron were weighed in such a manner that the composition of the main phase grains became the desired one, and a sheet like R-T-B alloy was obtained via the strip casting method. The alloy was subjected to a thermal treatment with stirring under a hydrogen stream so as to provide a coarse powder. Then, oleamide was added as the lubricant, and then a fine powder (an average particle size of 4.3 µm) was provided by using a jet mill at a non-oxidative atmosphere. The resultant fine powder was filled into a mold (hatch size: 20 mm×18 mm), and a magnetic field (2 T) was applied in the direction being at right angle to the direction in which the pressure was applied while the molding was done via the uniaxial compression with a pressure of 2.0 ton/cm$^2$. Thus obtained molded article was heated to 1050° C. and was kept at such a temperature for a certain period of time. Then, it was cooled down to room temperature. Thereafter, an aging treatment was performed for 1 hour at 850° C. and then for 1 hour at 530° C. so that a sintered article was obtained.

The magnetic properties of the sintered article were measured by a BH tracer. The value of $\Delta J/\Delta(H/HcJ)$ was calculated based on the obtained demagnetization curve.

The obtained sintered article was embedded into the epoxy resin, and then its section was polished. Commercially available abrasive papers were used in the polishing process. Specifically, the polishing process was performed while abrasive papers with increasing grit sizes were used in sequence. At last, a buff and a diamond abrasive grain were used in polishing. Here, the polishing process was done without providing any water or the like. If water was used, the grain boundary phases might erode.

The polished sample was observed by an electron microscope to figure out the state of the phases in the grain boundary portions. The different compositions of the grain boundary phases could be recognized via the reflected electron image based on its shade of colour. Thereby, it can be identified whether the R-rich phase in the grain boundaries was a multiple phase where multiple phases were compounded to exist or a solid solution phase where multiple R components were solid solved. In addition, a single phase was provided when only Nd was used as R.

Examples 1 to 8 and Comparative Examples 1 to 2

To 14.2 mol % R-5.8 mol % B-balance of Fe which was the basic components, 0.5 mass % of Co, 0.18 mass % of Al and 0.1 mass % of Cu were added. Then, a sintered article with such a composition was prepared. The composition of R (atomic %) and the time for sintering process were shown in Table 1. The magnetic properties, the residual magnetism deviation and the demagnetization in the resultant sintered articles were measured, and the results were shown in Table 1.

Compared to the sintered article with 100% of Nd, the addition of Y, Ce and/or La led to the decrease of the absolute value of the coercivity Ha. In addition, the $\Delta J/\Delta(H/HcJ)$ was also low. As a result, the residual magnetism deviation was small and the magnetization could be well controlled. As the squareness ratio (HK/HcJ) was high, no demagnetization was found. In Comparative Examples 1 and 2, the coercivity HcJ was high and the residual magnetism deviation become larger. Example 6 showed a lower $\Delta J/\Delta(H/HcJ)$ and a decreased residual magnetism deviation. However, if the coercivity HcJ significantly decreased to 1.2 kOe, demagnetization might occur.

Comparative Examples 3 to 5

The sintered articles in Comparative Examples 3 and 4 were prepared as in Examples 2 and 4 except that the time for the sintering process was set to be 2 hours. The sintered article in Comparative Example 6 was prepared as in Comparative Example 1 except that the time for the sintering process was set to be 12 hours. Compared to those in Examples 2 and 4, in the sintered articles in Comparative Examples 3 and 4, the coercivity HcJ was not greatly changed but the $\Delta J/\Delta(H/HcJ)$ was increased greatly. As a result, the residual magnetism deviation became larger. This was because the segregation was few in the grain boundary phases and the distribution of the coercivity became narrower.

In Comparative Example 5, the time for the sintering process was the same as those in Examples 1 to 8. Compared to Comparative Example 1, the coercivity HcJ decreased a little but the $\Delta J/\Delta(H/HcJ)$ did not increase. This was because that no segregation of Y, Ce and La was induced, and there was no distribution occurred in the magnetic separation in the grain boundary phases.

TABLE 1

| | Composition | Condition | Sintering | R-rich phase | HcJ (kOe) | Br (kG) | Hk/HcJ (%) | $\Delta J/\Delta$ (H/HcJ) (kG) | Residual magnetism deviation (kG) |
|---|---|---|---|---|---|---|---|---|---|
| Example 1 | 80%Nd—20%Y | Sintering for a long time | 12 hours | Multiple phase | 7.5 | 13.1 | 97.1 | 352 | 0.78 |
| Example 2 | 50%Nd—50%Y | Sintering for a long time | 12 hours | Multiple phase | 1.6 | 12.5 | 92.6 | 42 | 0.09 |
| Example 3 | 80%Nd—20%Ce | Sintering for a long time | 12 hours | Multiple phase | 7.9 | 13.2 | 96.6 | 380 | 0.81 |
| Example 4 | 50%Nd—50%Ce | Sintering for a long time | 12 hours | Multiple phase | 2.5 | 12.5 | 89.8 | 48 | 0.15 |
| Example 5 | 35%Nd—65%Ce | Sintering for a long time | 12 hours | Multiple phase | 2 | 12.2 | 85.2 | 40 | 0.15 |
| Example 6 | 25%Nd—75%Y | Sintering for a long time | 12 hours | Multiple phase | 1.2 | 12 | 92.1 | 37 | 0.11 |
| Example 7 | 50%Nd—50%La | Sintering for a long time | 12 hours | Multiple phase | 2.1 | 12.4 | 84.1 | 103 | 0.31 |
| Example 8 | 50%Nd—25%Y—25%Ce | Sintering for a long time | 12 hours | Multiple phase | 2.4 | 12.5 | 95.3 | 38 | 0.12 |
| Comparative Example 1 | 100%Nd | Sintering for a short time | 2 hours | Single phase | 13.8 | 13.5 | 98.1 | 756 | 2.09 |
| Comparative Example 2 | 90%Nd—10%Y | Sintering for a long time | 12 hours | Multiple phase | 10.5 | 13.5 | 97.4 | 634 | 1.54 |
| Comparative Example 3 | 50%Nd—50%Y | Sintering for a short time | 2 hours | Solid solution phase | 1.4 | 13.1 | 96.5 | 450 | 2.21 |
| Comparative Example 4 | 50%Nd—50%Ce | Sintering for a short time | 2 hours | Solid solution phase | 2.3 | 12.5 | 87.5 | 423 | 2.02 |
| Comparative Example 5 | 100%Nd | Sintering for a long time | 12 hours | Single phase | 13.3 | 13.4 | 97.9 | 705 | 2.31 |

As described above, the R-T-B based permanent magnet of the present invention has a high residual magnetic flux density and its magnetization can be well controlled by an external magnetic field. Thus, such a permanent magnet can be suitably used as a variable magnetic force magnet for a variable magnetic flux motor which can provide a high efficiency in the operation where variable speed is needed in people's livelihood, industries and conveyer equipments.

What is claimed is:

1. A R-T-B based permanent magnet, characterized by:
   a demagnetization curve having a slope $\Delta J/\Delta(H/HcJ)$ of less than 400 kG at a region where a value of a magnetic field is equal to or less than Hk in the demagnetization curve;
   wherein:
   a composition of R is represented by $R1_{1-x}R2_x$, where:
   R1 represents one or more rare earth elements selected from the group consisting of Pr, Nd, Sm, Eu, Gd, Tb, Dy, Ho, Er, Tm, Yb, and Lu,
   R2 represents Y, and
   $0.2 \leq x \leq 0.7$, where x represents an atomic ratio of R2;
   T represents one or more transition metal elements containing Fe or a combination of Fe and Co;
   Hk represents the value of the magnetic field when a magnetic flux density becomes 90% of a residual magnetic flux density Br; and
   the residual magnetic flux density Br is 12 kG or more and a coercivity HcJ is less than 8.0 kOe; and
   a squareness ratio Hk/HcJ is 80% or more.

2. The R-T-B based permanent magnet according to claim 1, wherein
   a grain boundary phase of the R-T-B based permanent magnet contains a R-rich phase, and
   the R-rich phase contains a R1-rich phase and a R2-rich phase.

3. A variable magnetic flux magnet comprising the R-T-B based permanent magnet according to claim 1.

4. A variable magnetic flux magnet comprising the R-T-B based permanent magnet according to claim 2.

5. A variable magnetic flux motor comprising the R-T-B based permanent magnet according to claim 1.

6. A variable magnetic flux motor comprising the R-T-B based permanent magnet according to claim 2.

7. A R-T-B based permanent magnet, characterized by:
   a demagnetization curve having a slope $\Delta J/\Delta(H/HcJ)$ of 352 kG or less at a region where a value of a magnetic field is equal to or less than Hk in the demagnetization curve;
   wherein:
   a composition of R is represented by $R1_{1-x}R2_x$, where:
   R1 represents Nd,
   R2 represents at least one element selected from the group consisting of Y and La, and
   $0.2 \leq x \leq 0.5$, where x represents an atomic ratio of R2;
   T represents Fe,
   Hk represents the value of the magnetic field when the magnetic flux density becomes 90% of a residual magnetic flux density Br;
   the residual magnetic flux density Br is 12.4 kG or more and the coercivity HcJ is 7.5 kOe or less; and
   a squareness ratio Hk/HcJ is 84.1% or more.

8. The R-T-B based permanent magnet according to claim 7, wherein
   a grain boundary phase of the R-T-B based permanent magnet contains a R-rich phase, and
   the R-rich phase contains a R1-rich phase and a R2-rich phase.

9. A variable magnetic flux magnet comprising the R-T-B based permanent magnet according to claim 7.

10. A variable magnetic flux magnet comprising the R-T-B based permanent magnet according to claim 8.

11. A variable magnetic flux motor comprising the R-T-B based permanent magnet according to claim 7.

12. A variable magnetic flux motor comprising the R-T-B based permanent magnet according to claim 8.

* * * * *